Nov. 20, 1956 — W. L. MORRISON — 2,770,951
APPARATUS FOR UNLOADING IN GASEOUS FORM
FROM A LIQUEFIED GAS STORAGE BODY
Filed Dec. 31, 1952 — 2 Sheets-Sheet 2
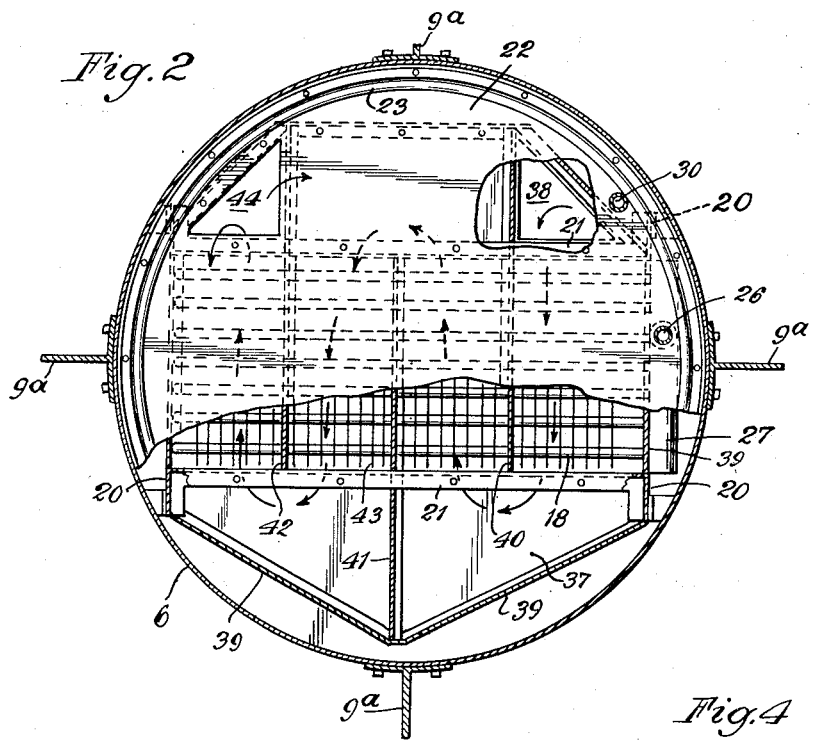
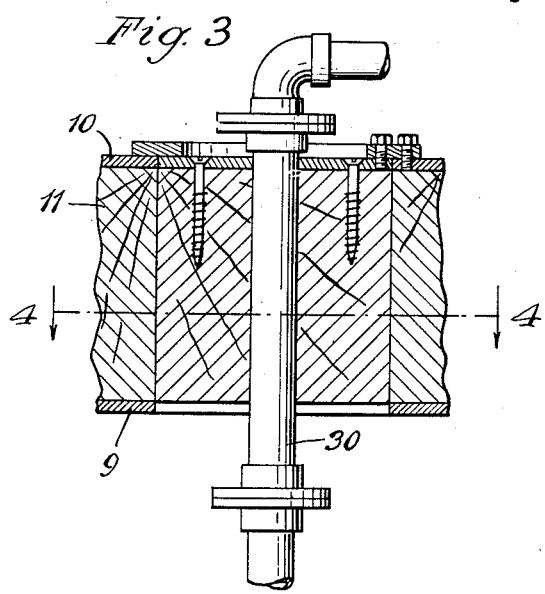
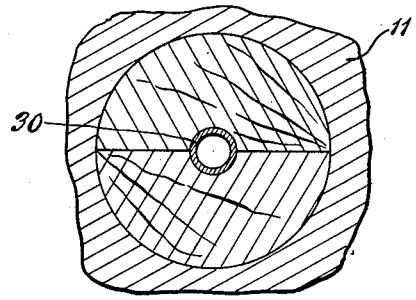
Inventor
Willard L. Morrison
by Parker & Carter
Attorneys

United States Patent Office 2,770,951
Patented Nov. 20, 1956

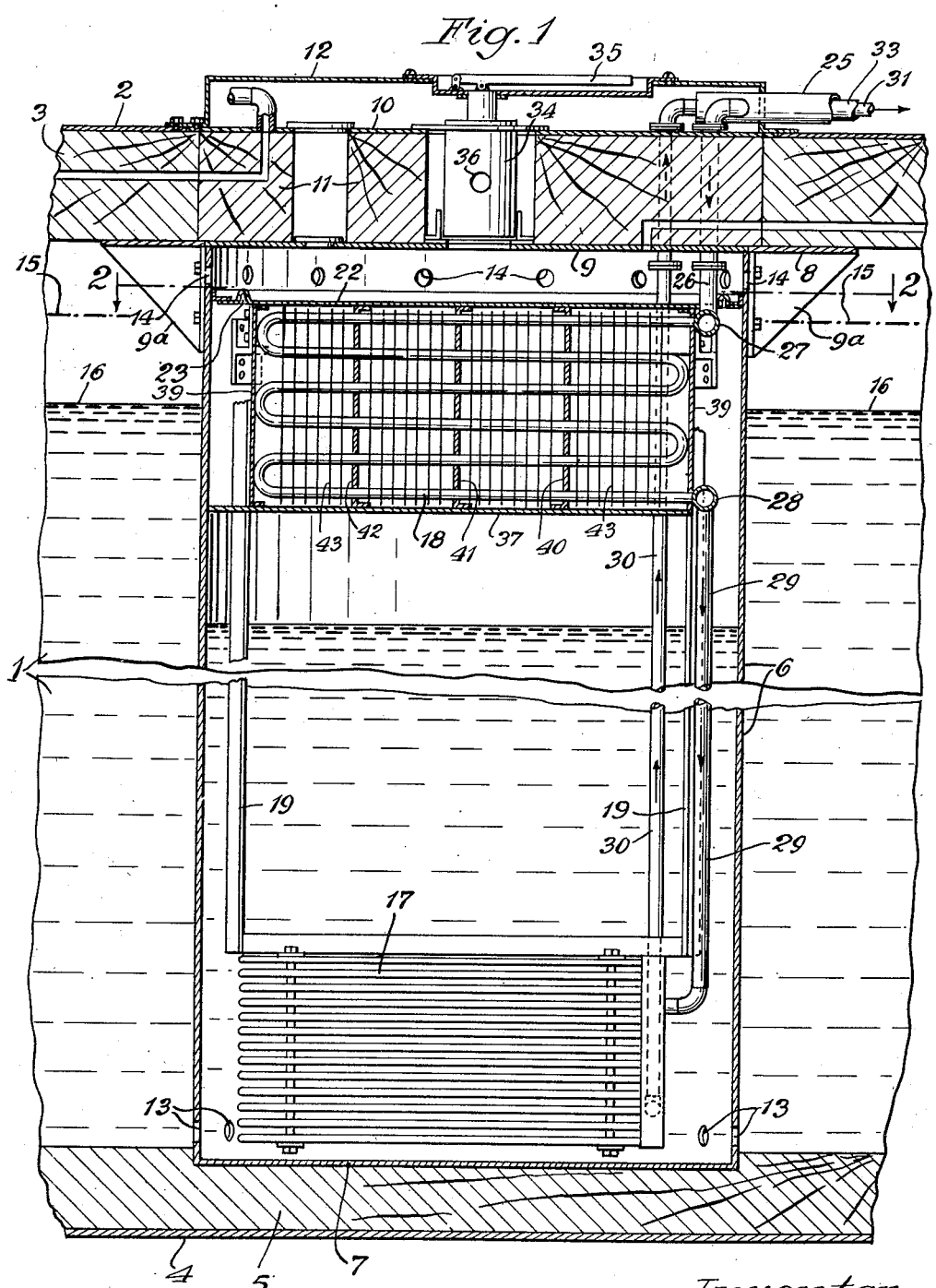

2,770,951

APPARATUS FOR UNLOADING IN GASEOUS FORM FROM A LIQUEFIED GAS STORAGE BODY

Willard L. Morrison, Lake Forest, Ill., assignor to Union Stock Yards & Transit Company of Chicago, Chicago, Ill., a corporation of Illinois Application December 31, 1952, Serial No. 328,862

8 Claims. (Cl. 62—1)

My invention relates to apparatus for and method of vaporizing gas stored in a container as a liquid at substantially atmospheric pressure and discharging it in gaseous condition from the container.

My invention is especially well adapted for handling liquid methane and the like, which, when stored at atmospheric pressure, must be well insulated and held at extremely low temperature to prevent excessive evaporation.

One object of my invention is to provide means for vaporizing of the very cold liquid methane, so that it may be rapidly discharged for use.

In general, when one or more insulated tanks of liquid methane and the like are to be discharged, it becomes necessary to speed up the vaporization process. Liquid methane at temperatures of —278° F. may be stored at substantially atmospheric pressure in an insulated tank and such tank may be propelled from point of origin of the gas to point of use with a minimum wastage as the result of evaporation. With liquid methane as with water, atmospheric pressure not changing, the heat which enters the liquid mass will vaporize it without change in temperature until the entire liquid mass has boiled away. The temperature of the methane gas as it is evaporated from the liquid mass, is too low for practical use of the gas, so it is desirable first to vaporize it and then to raise its temperature.

I propose to segregate some of the liquid and to heat the segregated gas, to boil and vaporize it, and then to pass the methane through a superheating zone to raise the temperature above the temperature at which it boiled off the cold liquid.

My invention is illustrated more or less diagrammatically in the accompanying drawings.

Figure 1 is a vertical section through a portion of a storage tank and through the methane boiler and superheater.

Figure 2 is a section along the line 2—2 of Figure 1.

Figure 3 is a vertical section through the roof insulation of the methane tank.

Figure 4 is a section along the line 4—4 of Figure 3.

Like parts are indicated by like characters in the specification and drawings.

1 is a storage tank. The side walls are not illustrated. Suffice it to say it may be a tank of substantial horizontal width, will preferably be circular, and will have a bottom and a top. The tank is preferably of metal and has an insulating lining which may take the form of balsa wood, which is a good insulator, does not deteriorate or substantially lose strength in the presence of liquid methane at —278° F. and under such circumstances affords entirely adequate insulation to limit heat flow into the mass of liquified methane within the tank.

2 is the roof of the tank with its balsa wood lining 3. 4 is the metal bottom of the tank with its balsa wood floor 5, side walls not being shown.

6 is a cylindrical stainless steel column or boiler extending upwardly from a circular floor 7 inlet into the balsa wood floor 5 as indicated. The stainless steel column 6 extends upwardly to engage the steel ring 8, there being angle plates 9a interposed between the column and the ring 8. The balsa wood roofing is supported by the ring 8, which is annular and apertured to receive a cover plate 9 in register with the column. The cover plate 9, together with the outer cover plate 10, is associated with a balsa plug 11 masked by a dome 12, the dome 12 being attached to the cover 2 so that it may be removed when desired to give access to the balsa wood plug 11 and its associated parts. Since the dome 12 overlies the plug, the bolts which hold it in position may also be relied upon to hold the plug in place, closing the methane tank. The boiler 6 is apertured at 13 at the bottom, generally in alignment with the floor 5, and at 14 at the top above the liquid level, these apertures being distributed around the periphery of the column.

15 indicates the level of the liquid methane in the tank when the tank has been filled and the trip to convey the methane to a point of use is about to commence.

16 indicates the level of the liquid in the tank at the end of the trip at the time it is desired to discharge the methane from the tank.

Contained within the column or boiler 6 is a methane boiler or vaporizer coil 17 immersed in the liquid methane. The methane normally has the same level outside as inside the column. Pressure is equalized through the apertures 13 and 14.

18 is a superheater coil adjacent the top of the boiler 6. The boiler and superheater coils are tied together by vertical struts 19 which engage vertical tracks 20 spaced about the periphery of the column 6 and so offset with respect to the tying cross members 21 that expansion and contraction of the struts, boiler and superheater making a vaporizing assembly will not upset the relationship between that assembly and the column and the assembly may be inserted in the boiler or withdrawn therefrom without interference.

22 is an apartment cover plate overlying the boiler assembly. Relative expansion and contraction of the cover plate 22 with respect to the column 6 is permitted by copper or other metal bellows arrangement 23 rigidly attached at one side to the cover plate and at the other side to the boiler-superheater assembly so that escape of gas from the boiler assembly to the area above the boiler assembly indicated at 24 must in every instance be through or around the superheater coils.

25 is the intake pipe for the boiler. It receives a relatively warm liquid in, for example, a Freon mixture, which will not freeze at the temperature of liquid methane. The warm Freon liquid is brought in by the pipe 25 from any suitable source of supply which forms no part of the present invention. Communicating with the pipe 25 within the hood or dome 12 is a pipe 26 which leads to the header 27 of the superheater coil 18 so that the relatively warm Freon—in one case at 5° F.—passes first through the superheater coil 18, is discharged to the header 28, then passes through a pipe 29 to the upper portion of the boiler coil 17, returns from the boiler coil 17 through the pipe 30, passing upwardly through the plug 11 and entering concentric with the pipe 25 to be discharged through a pipe 31 at, for example, 232° F., for warming and return to the boiler. Pipe 33 is interposed concentrically between pipes 25 and 31 to provide a dead air space to limit heat flow between the entering Freon at 5° F. and the discharging Freon at —232° F.

34 is a discharge valve in the plug 11, through which, under control of the lever 35, the vaporized methane may be discharged through discharge aperture 36 to any suitable pipe connection not illustrated, the details of the aperture and connection forming no part of invention.

When methane is to be discharged from the tank, pipes 25, 31 and 33 are connected up to any suitable apparatus for warming and circulating the Freon. The warm Freon passes through the superheater and the boiler coils. This vaporizes the methane in the boiler but does not superheat the gas. Since the superheater coils are immersed in the liquid, they can only help to vaporize the gas which is discharged at liquid temperature. The superheater coils, in the path of the gas to discharge resist gas flow, the pressure drop through the superheater being in the order of .35 p. s. i. Therefore, the pressure above the superheater coils will be in the order of 14.7 p. s. i. a. and the pressure below the superheater coils will be in the order of 15.05 p. s. i. a. The pressure in the area outside the boiler being atmospheric will also be 14.7 p. s. i. a. The increased pressure below the superheater coils will lower the level of the liquid methane in the boiler, forcing it out through the holes 13 against atmospheric pressure. This results in de-watering, so to speak, the superheater coils, that is in lowering the liquid level to expose the superheating coils to the vapor only so they can now act just as the superheater coils in a steam water boiler act to add superheat to the vaporized methane. The boiler coil 17 below then vaporizes the methane. The superheater coils 18 add superheat to raise the temperature up to the point at which the methane can be handled. The Freon or other non-freezing eutectic, entering first at 5° F., superheats the gas and then later at a somewhat lower temperature vaporizes the liquid; the temperature of the returning Freon as a result of the absorption of heat by the methane will be in the order of −232° F.

I noted above that stainless steel and balsa wood were used in connection with my apparatus and method. The reason for this is that these two materials are specially well adapted for the purpose. Stainless steel is a poor conductor. It keeps its strength at the temperatures involved. Balsa wood is a poor conductor and does not suffer substantial loss in strength, stiffness, etc., at the temperatures involved, nor does it deteriorate as the result of contact with liquid or gaseous methane, though other metals and other insulating means might be used. The same is true of the Freon or other eutectic. Any eutectic which will not freeze at the temperature of liquified methane is entirely satisfactory, provided it is a material which will not cause excessive deterioration of the pipes through which it is compelled to pass.

By my arrangement, as the level of the liquid in the tank falls, the time will come when only a portion of the boiler coil will be immersed in the liquid and so the effectiveness of the coil will be reduced, but this will be compensated for by virtue of the fact that as the amount of heat extracted from the coil decreases, drop in temperature of the eutectic will also decrease so the eutectic as circulating through the superheater coils and the boiler will rise in temperature to compensate for decrease in boiler area exposed to the methane.

Under these circumstances, the time will come when all the liquid methane has drained out of the tank into the boiler and the temperature there will be high enough to insure vaporization of all the remaining methane if and when it is desired to completely purge the tank. As a matter of fact, this will seldom happen because under ordinary circumstances, the methane evaporated by heat infiltration is relied upon to furnish the fuel to propel a barge carrying the methane tank and the barge must, of course, be propelled back to the source of origin after it has been emptied so the emptying process will always be discontinued early enough to leave an adequate supply of liquid methane in the tank to furnish the power for the return trip.

While any suitable means can be used to develop the differential pressure in the boiler whereby the superheater coils may be freed from the liquid by reduction of the liquid level in the boiler, and return of some of the liquid to the tank, I have illustrated one suitable means for accomplishing this purpose as follows.

37 is a plate bounding the bottom of the superheater, 38 is an aperture in said plate communicating with the lower portion of the boiler, 39 is a polygonal wall, interposed between the plate 37 and the cover plate 22, enclosing the superheater coil. 40, 41 and 42 are baffle walls between the plates 37 and 22. The coils 18 extend through the baffle walls and carry heat exchanger fins 43 so that there is a path from the boiler through the aperture 38 around the baffle plates, as indicated by the arrows, in Figure 2 for exit through the port 44 in the plate 22 to the space in the boiler above the plate 22 which because of ports 14 is always at the same pressure as the storage tank.

I have shown the discharge of vaporized superheated gas from that space but the discharge might equally well be from some other part of the storage tank.

The tortuous passage around the superheater coils is quite adequate to provide a resistance to flow of gas or liquid to insure the increase in pressure within the boiler below the superheater coils so that they may serve as superheater rather than boiler coils.

I have shown the superheater and boiler coils in series. Under some circumstances they could well be in parallel.

While I have illustrated the superheater and vaporizer coils as being heated by circulating warm liquid, they could be heated by other suitable means such as electric resistors.

I claim:

1. The combination with a container for a cargo of liquefied gas maintained at a predetermined pressure and subatmospheric temperature, of means for progressively converting such cargo to gaseous form and delivering it from said container at a pressure at least as great as said predetermined pressure, said means comprising: (a) an enclosure supported in said container with at least the lower portion thereof below the level of liquefied gas in such container, said enclosure divided into lower and upper compartments and provided with (i) a first passage for the entrance of liquefield gas into said lower compartment, (ii) a second restricted passage connecting said compartments, and (iii) a third passage for the discharge of the vaporized gas from the upper compartment; (b) heat exchange coils in said upper and lower compartments respectively; and (c) means for circulating a heat exchange fluid, which is initially warmer than said liquefied gas, through said heat exchange coils.

2. The combination with a container for a cargo of liquefied gas maintained at a predetermined pressure and subatmospheric temperature, of means for progressively converting such cargo to gaseous form and delivering it from said container at a pressure at least as great as said predetermined pressure, said means comprising: (a) an enclosure supported in said container with at least the lower portion thereof below the level of liquefied gas in such container, said enclosure divided into lower and upper compartments and provided with (i) a first passage for the entrance of liquefied gas into said lower compartment, (ii) a second restricted passage connecting said compartments, and (iii) a third passage for the discharge of the vaporized gas from the upper compartment; (b) first and second heat exchange coils in said upper and lower compartments respectively; and (c) means for circulating through said heat exchange coils a heat exchange fluid in such quantity and at such temperature as to vaporize the liquefied gas in the lower portion of said enclosure at a rate sufficient to build up therein a pressure greater than that in said container to depress the liquid level in said container to a level below said first heat exchange coils.

3. The combination with a container for a cargo of liquefied gas maintained at atmospheric pressure and subatmospheric temperature, of means for progressively converting such cargo to gaseous form and delivering it at substantially atmospheric pressure from said container, said means comprising: (a) an enclosure supported in said container with at least the lower portion thereof below the level of liquefied gas in such container, said enclosure divided into lower and upper compartments and provided with (i) a first passage for the entrance of liquefied gas into said lower compartment, (ii) a second restricted passage connecting said compartments, and (iii) a third passage for the discharge of the vaporized gas from the upper compartment; (b) first and second heat exchange coils in said upper and lower compartments respectively; and (c) means for circulating a heat exchange fluid, which is initially warmer than said liquefied gas, in series through said first and second heat exchange coils.

4. The combination with a container for a cargo of liquefied gas maintained at atmospheric pressure and subatmospheric temperature, of means for progressively converting such cargo to gaseous form and delivering it at substantially atmospheric pressure from said container, said means comprising: (a) an enclosure supported in said container with at least the lower portion thereof below the level of liquefied gas in such container, said enclosure divided into lower and upper compartments and provided with (i) a first passage for the entrance of liquefied gas into said lower compartment, (ii) a second restricted passage connecting said compartments, (iii) a third passage for the discharge of the vaporized gas from the upper compartment; and (iv) a restricted passage between the upper portions of said container and enclosure; (b) first and second heat exchange coils in said upper and lower compartments respectively; and (c) means for circulating a heat exchange fluid, which is initially warmer than said liquefied gas, through said heat exchange coils a heat exchange fluid in such quantity and at such temperature as to vaporize the liquefied gas in the lower portion of said enclosure at a rate sufficient to build up therein a pressure greater than that in said container to depress the liquid level in said container to a level below said first heat exchange coils.

5. The combination with a container for a cargo of liquefied gas maintained at atmospheric pressure and subatmospheric temperature, of means for progressively converting such cargo to gaseous form and delivering it at substantially atmospheric pressure from said container, said means comprising: (a) an enclosure supported in said container with at least the lower portion thereof below the level of liquefied gas in such container, said enclosure divided into lower and upper compartments and provided with (i) a first passage for the entrance of liquefied gas into said lower compartment, (ii) a second restricted passage connecting said compartments, (iii) a third passage for the discharge of the vaporized gas from the upper compartment; and (iv) a restricted passage between the upper portions of said container and enclosure; (b) first and second heat exchange coils in said upper and lower compartments respectively; and (c) means for circulating a heat exchange fluid, which is initially warmer than said liquefied gas, in series through said first and second heat exchange coils.

6. The combination with a container for a cargo of liquefied gas maintained at atmospheric pressure and subatmospheric temperature, of means for progressively converting such cargo to gaseous form and delivering it at substantially atmospheric pressure from said container, said means comprising: (a) an enclosure supported in said container with at least the lower portion thereof below the level of liquefied gas in such container, said enclosure divided into lower and upper compartments and provided with (i) a first passage for the entrance of liquefied gas into said lower compartment, (ii) a second restricted passage connecting said compartments, (iii) a third passage for the discharge of the vaporized gas from the upper compartment; and (iv) a restricted passage between the upper portions of said container and enclosure; (b) first and second heat exchange coils in said upper and lower compartments respectively; and (c) means for circulating in series through said first and second heat exchange coils a heat exchange fluid in such quantity and at such temperature as to vaporize the liquefied gas in the lower portions of said enclosure at a rate sufficient to build up therein a pressure greater than that in said container to depress the liquid level in said container to a level below said first heat exchange coils.

7. The combination with a container for a cargo of liquefied gas maintained at a predetermined pressure and subatmospheric temperature, of means for progressively converting such cargo to gaseous form and delivering it from said container at a pressure at least as great as said predetermined pressure, said means comprising: (a) a pair of interconnected compartments, the lower one of which is below the level of the liquid in the container and provided with (i) a first passage for the entrance of liquefied gas into said lower compartment, (ii) a second restricted passage connecting said compartments, and (iii) a third passage for the discharge of the vaporized gas from the upper compartment; (b) heat exchange coils in said upper and lower compartments, respectively; and (c) means for circulating heat exchange fluid, which is initially warmer than said liquefied gas, through said heat exchange coils.

8. The combination with a container for a cargo of liquefied gas maintained at a predetermined pressure and subatmospheric temperature, of means for progressively converting such cargo to gaseous form and delivering it from said container at a pressure at least as great as said predetermined pressure, said means comprising: (a) a pair of interconnected compartments, the lower one of which is below the level of the liquid in the container and provided with (i) a first passage for the entrance of a liquefied gas into said lower compartment, (ii) a second restricted passage connecting said compartments, and (iii) a third passage for the discharge of the vaporized gas from the upper compartment; (b) first and second heat exchange coils in said upper and lower compartments, respectively; and (c) means for circulating through said heat exchange coils, a heat exchange fluid in such quantity and at such temperature as to vaporize the liquefied gas in the lower compartment at a rate sufficient to build up therein a pressure greater than that in said container to depress the liquid level in the container to a level below the first heat exchange coils.

References Cited in the file of this patent

UNITED STATES PATENTS 2,343,727  Zenner ---------------- Mar. 7, 1944